US011418463B2

(12) United States Patent
Rey et al.

(10) Patent No.: US 11,418,463 B2
(45) Date of Patent: Aug. 16, 2022

(54) METHOD AND SYSTEM OF INTELLIGENTLY PROVIDING RESPONSES FOR A USER IN THE USER'S ABSENCE

(71) Applicant: MICROSOFT TECHNOLOGY LICENSING, LLC, Redmond, WA (US)

(72) Inventors: Romain Gabriel Paul Rey, Vancouver (CA); Mastafa Hamza Foufa, Nimes (FR); Fernando Javier Yanez Lucero, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/101,763

(22) Filed: Nov. 23, 2020

(65) Prior Publication Data

US 2022/0166731 A1 May 26, 2022

(51) Int. Cl.
*H04L 51/02* (2022.01)
*G06N 20/00* (2019.01)
(Continued)

(52) U.S. Cl.
CPC ............ *H04L 51/02* (2013.01); *G06F 40/40* (2020.01); *G06N 20/00* (2019.01); *H04L 51/043* (2013.01); *H04L 51/14* (2013.01)

(58) Field of Classification Search
CPC ....... H04L 51/02; H04L 51/043; H04L 51/14; G06F 40/40; G06N 20/00
See application file for complete search history.

(56) References Cited

U.S. PATENT DOCUMENTS 8,719,200 B2  5/2014  Beilby et al.
9,064,244 B2  6/2015  Brauninger et al.
(Continued)

FOREIGN PATENT DOCUMENTS

EP     3937030 A1    1/2022
WO  2006129967 A1  12/2006

OTHER PUBLICATIONS

"Azure Bot Service documentation", Retrieved from: https://web.archive.org/web/20200927123520/https://docs.microsoft.com/en-us/azure/bot-service/?view=azure-bot-service-4.0, Sep. 27, 2020, 2 Pages.
(Continued)

*Primary Examiner* — Soe Hlaing
(74) *Attorney, Agent, or Firm* — NovoTechIP International PLLC

(57) ABSTRACT

A method and system for responding to a message directed to a recipient includes receiving the message including a query from a sender, receiving an indication that the recipient is unavailable to respond to the query, and providing the query to as an input to a machine-learning (ML) model to identify information requested in the query. The method further includes obtaining the information requested as an output from the ML model, determining if access to the information requested is available to the sender, based on a confidentiality group to which the sender belongs with respect to the information requested, upon determining that access to the information requested is available, generating a response to the query that includes the information requested, and providing the response to the sender. The confidentiality group to which the sender belongs may be determined based on a degree of association between the sender and the information requested.

17 Claims, 13 Drawing Sheets

(51) Int. Cl.
*G06F 40/40* (2020.01)
*H04L 51/043* (2022.01)
*H04L 51/00* (2022.01)

(56) References Cited

U.S. PATENT DOCUMENTS

| | | |
|---|---|---|
| 9,065,786 B2 | 6/2015 | Plotkin |
| 9,467,400 B2 | 10/2016 | Bhatia et al. |
| 10,650,824 B1 | 5/2020 | Kesharaju et al. |
| 2005/0289342 A1* | 12/2005 | Needham ............ G06F 21/6227 713/169 |
| 2010/0198924 A1 | 8/2010 | Collet et al. |
| 2018/0077088 A1* | 3/2018 | Cabrera-Cordon .... G06N 3/006 |
| 2018/0359199 A1 | 12/2018 | Nguyen et al. |
| 2019/0050406 A1 | 2/2019 | Nguyen et al. |
| 2020/0293678 A1 | 9/2020 | Feuz et al. |
| 2020/0327555 A1 | 10/2020 | Sapoznik et al. |
| 2020/0336443 A1 | 10/2020 | Pottier |

OTHER PUBLICATIONS

"Machine Reading Comprehension", Retrieved from: https://web.archive.org/web/20200523123434/https://www.microsoft.com/en-us/ai/ai-for-earth/, May 19, 2020, 4 Pages.

"Question Answering on SQuAD1.1", Retrieved from: https://paperswithcode.com/sota/question-answering-on-squad11, Retrieved Date: Sep. 9, 2020, 10 Pages.

French, Richard, "Attended Automation Can Make Remote Workers Even More Productive", https://www.tlnt.com/attended-automation-can-make-remote-workers-even-more-productive/, Jul. 15, 2019, 5 Pages.

Lewis, et al., "Unsupervised Question Answering by Cloze Translation", In Repository of arXiv:1906.04980v2, Jun. 27, 2019, 15 Pages.

"International Search Report and Written Opinion Issued in PCT Application No. PCT/US2021/056790", dated Feb. 11, 2022, 12 Pages.

* cited by examiner

METHOD AND SYSTEM OF INTELLIGENTLY PROVIDING RESPONSES FOR A USER IN THE USER'S ABSENCE

TECHNICAL FIELD

This disclosure relates generally to intelligently providing responses for a user when the user is not available, and, more particularly, to a method of and system for intelligently responding to queries directed to a user when the user is not available to answer the queries.

BACKGROUND

In recent years, there has been a significant increase in the use of communication mechanisms that enable a person to communicate with others that are located remotely in real-time. These mechanisms may enable individuals to communicate and collaborate with each other instantaneously, even when they are not in the same location. This has allowed people to work with each other from remote locations, providing more flexibility and reducing the need for frequent travel.

While these mechanisms have enabled instantaneous exchange of information between remote users, collaboration can be achieved only when the users are available at the same time to engage in real-time communications. However, with collaborators living in different time zones and more individuals moving away from standard working hours and towards having flexible work schedules, not everyone may be available to use these communications mechanism at the same time. As a result, timely communication and collaboration between individuals has become increasing challenging. Lack of synchronicity in work schedules and the resulting lag in communications may lead to inefficiencies. For example, an individual may need to wait for another person to become available to get a response to a question or have access to a document, and as such may not be able to finish a task on time. When multiple people have differing availability schedules, the resulting loss of time and efficiency can become significant.

Hence, there is a need for improved systems and methods for intelligently responding to queries directed to a user when the user is not available to answer the queries.

SUMMARY

In one general aspect, disclosed herein is a data processing system having a processor and a memory in communication with the processor wherein the memory stores executable instructions that, when executed by the processor, cause the data processing system to perform multiple functions. The functions may include receiving a message from a sender directed to a recipient, the message including a query, receiving an indication that the recipient is unavailable to respond to the query, providing the query as an input to a machine-learning (ML) model to identify information requested in the query, obtaining the information requested as an output from the ML model, determining if access to the information requested is available to the sender, based at least on a confidentiality group to which the sender belongs with respect to the information requested, the confidentiality group to which the sender belongs with respect to the information requested being determined based on a degree of association between the sender and the information requested, upon determining that access to the information requested is available, generating a response to the query, the response including the information requested, and providing the response to the sender.

In yet another general aspect, the instant application describes a method for responding to a message directed to a recipient. The method may include receiving the message from a sender, the message including a query, receiving an indication that the recipient is unavailable to respond to the query, providing the query as an input to a machine-learning (ML) model to identify information requested in the query, obtaining the information requested as an output from the ML model, determining if access to the information requested is available to the sender, based at least on a confidentiality group to which the sender belongs with respect to the information requested, the confidentiality group to which the sender belongs with respect to the information requested being determined based on a degree of association between the sender and the information requested, upon determining that access to the information requested is available, generating a response to the query, the response including the information requested, and providing the response to the sender.

In a further general aspect, the instant application describes a non-transitory computer readable medium on which are stored instructions that when executed cause a programmable device receive a message from a sender directed to a recipient, the message including a query, receive an indication that the recipient is unavailable to respond to the query, provide the query as an input to a machine-learning (ML) model to identify information requested in the query, obtain the information requested as an output from the ML model, determine if access to the information requested is available to the sender, based at least on a confidentiality group to which the sender belongs with respect to the information requested, the confidentiality group to which the sender belongs with respect to the information requested being determined based on a degree of association between the sender and the information requested, upon determining that access to the information requested is available, generate a response to the query, the response including the information requested, and providing the response to the sender.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
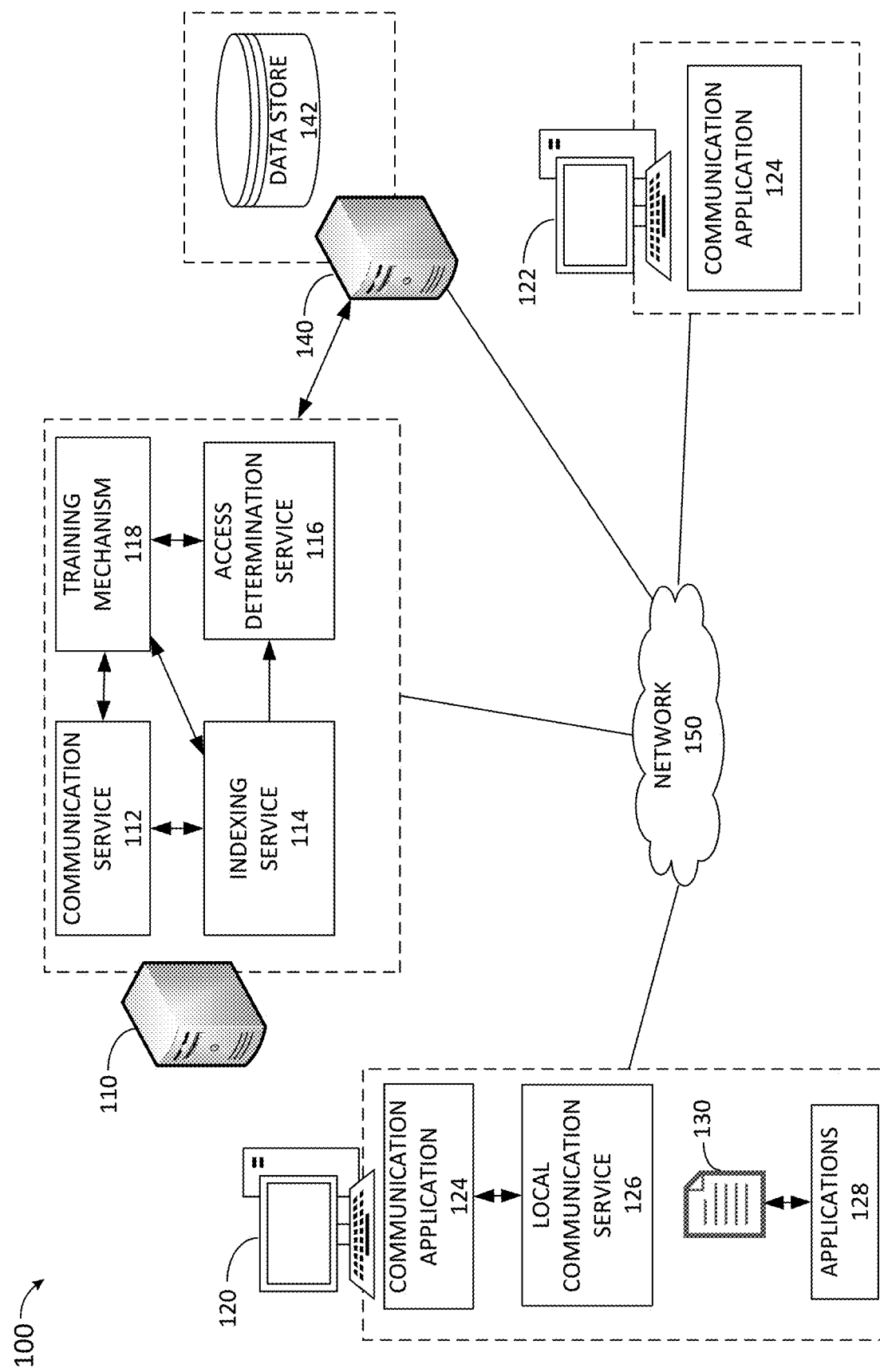
FIG. 1A-1C depict an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

More and more people have recently begun working remotely and/or working based on a flexible work schedule. While remote working has significantly increased the use of communication mechanisms that enable instantaneous communication and/or collaboration, differing work schedules make use of such communications mechanisms for instant communication difficult, thus limiting the efficiency of collaboration and teamwork. In particular, when different individuals are available to communicate at different times, queries may remain unanswered until the absent user becomes available. By then the requester may no longer be present. This can result in a cumulative loss of time and efficiency, particularly when the requester needs access to certain information and/or document to perform a task. Thus, there exists the technical problem of providing timely access to requested information and/or documents in response to a query when the person to which the query is directed is not available.

Furthermore, because of confidentiality, privacy and security issues, automatically providing access to information and/or documents in response to a query may not be feasible. When the person to whom the query is directed is not available to review the response, it is possible that an automatic response which provides information could reveal confidential and/or private data to which the requester should not have gained access. Moreover, a system of providing automatic responses to queries would be viable to security breaches (e.g., scammers or hackers could use the system to gain unauthorized access to information). There exists no known mechanism for addressing the aforementioned. As a result, there exists a technical problem of taking confidentiality, privacy and security into account when providing automatic responses to queries directed to a person who is not available.

To address these technical problems and more, in an example, this description provides a technical solution used for intelligently responding to a query directed to a user who is not available to answer the query within a given time period. To do so, techniques may be used to extract information about the content a user accesses or works with, index the content based on the extracted information, create different levels of confidentiality based on various factors including degrees of association between the requester and the information and/or the user the request is directed to, train a machine-learning (ML) model based on the index information and the confidentiality levels, and utilize an autonomous software program that can interact with users (e.g., a bot) to respond to queries when the user to whom a query is directed is unavailable. Various steps of these mechanisms may be performed by utilizing one or more ML models. As a result, the technical solution provides a mechanism for automatically, safely and quickly responding to queries directed at an individual who is currently unavailable to provide a response.

As will be understood by persons of skill in the art upon reading this disclosure, benefits and advantages provided by such implementations can include, but are not limited to, a technical solution to the technical problems of inability to efficiently and/or securely provide access to information and/or documents associated with a user when the user is not available. Solutions and implementations provided herein optimize the process of communicating and collaborating with other users by providing timely access to information and/or documents even when users are not available to respond themselves. This may enable collaborators to gain access to materials they need to perform a task faster thus preventing unnecessary loss of time. The benefits provided by these technology-based solutions yield more user-friendly applications, and increased system and user efficiency.

As used herein, the term "conversational agent" may refer to an autonomous software program (e.g., a bot) that can automatically interact with a user when the person to whom the user's query is directed is unavailable. Furthermore, as used herein, a "query" may refer to a question, a request or any other communication to which a response in the form information and/or a document may be required.

FIG. 1A illustrates an example system 100, upon which aspects of this disclosure may be implemented. The system 100 may include a server 110 which may include and/or execute a communication service 112, an indexing service 114, access determination service 116, and a training mechanism 118. The server 110 may operate as a shared resource server located at an enterprise accessible by various computer client devices such as client devices 120 and 122. The server may also operate as a cloud-based server for offering communication, indexing, and access determination services. Although shown as one server, the server 110 may represent multiple servers for performing various different operations. For example, the server 110 may include one or more processing servers for performing the operations of the communication service 112, indexing service 114, and access determination service 116.

The communication service 112 may provide intelligent responses to a query directed to a person who is not available to answer the query within a given time period. The communication service 112 may operate to examine a received communication (e.g., an instant message or email) user interactions with a document), determine if the recipient is unavailable, examine the received communication to determine if it includes a query (e.g., a question or request), classify the query (e.g., a request, a question, related to data, related to social interaction, and the like), transmit the query to the access determination service to determine if the requested information is available to the requester, and upon confirmation that the information is available, retrieve and present the information to the request. The communication service 112 may be provided by one or more classifiers and ML models, as further discussed below with regards to FIG. 1B.

The indexing service 114 may provide intelligent indexing of content associated with a user. This may include retrieving content the user has recently accessed, shared, worked on, received, or has otherwise been associated with, retrieving metadata associated with the retrieved content, indexing the retrieved content and metadata, determining a degree of proximation between the content and other users and/or between the user and other users, and creating different confidentiality levels for different groups of users based on the degree of proximation and/or other factors. The indexing service 114 may include one or more ML models, as further discussed below with regards to FIG. 1B.

The access determination service 116 may provide intelligent access determination services. This may include examining a query received by the communication service 112, and determining based on the requester, the type of information and/or document they requested and/or the degree of proximation between the requester and/or the requested information or the requester and/or the receiver whether or not access should be granted. The access determination 116 may include one or more ML models for making these determinations, as further discussed below with regards to FIG. 1B.

The server 110 may be connected to or include a storage server 140 containing a data store 142. The data store 142 may function as a repository in which documents, contextual information, metadata, indexed information and/or data sets (e.g., training data sets) may be stored. One or more ML models used by the communication service 112, indexing service 114 and/or access determination service 116 may be trained by a training mechanism 118. The training mechanism 118 may use training data sets stored in the data store 142 to provide initial and ongoing training for each of the models. Alternatively, and/or additionally, the training mechanism 118 may use training data sets unrelated to the data store. This may include training data such as knowledge from public repositories (e.g., internet), knowledge from other enterprise sources, or knowledge from other pretrained mechanisms (e.g., pretrained models). In one implementation, the training mechanism 118 may use labeled training data from the data store 142 to train one or more of the ML models via deep neural network(s) or other types of ML algorithms. Alternatively, and/or additionally, the training mechanism 118 may use unlabeled training data. The initial training may be performed in an offline stage or may be performed online. Additionally, and/or alternatively, the one or more ML models may be trained using batch learning. It should be noted that in collecting and storing training data and training the ML models care is taken to ensure users privacy is protected and the training is performed such that it complies with ethical and legal guidelines.

As a general matter, the methods and systems described herein may include, or otherwise make use of, machine-trained models for automated question answering, for classifying a query, for determining a degree of proximation between users and information, and for determining if access to data or information should be provided to a user. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity and/or determine associations between various actions and commands. Such determination may be made following the accumulation, review, and/or analysis of data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of relevant commands and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of these ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models. It should be noted that the ML model(s) discussed herein may be hosted locally on the client devices 120 and 122 or remotely, e.g., in the cloud. In one implementation, some ML models are hosted locally, while others are stored remotely.

The client devices 120 and 122 may be connected to the server 110 and to each other via a network 152. The network 152 may be a wired or wireless network(s) or a combination of wired and wireless networks that connect one or more elements of the system 100. Each of the client devices 120 and 122 may be a personal or handheld computing device having or being connected to input/output elements that enable a user to interact with another user via a communication mechanism such as a communication application 124 or a communication portal of a content creation application. Examples of such applications include instant messaging applications, email applications, collaborative-work environments, digital conferencing applications, word-processing applications, presentation applications, and the like. Examples of suitable client devices 120 include, but are not limited to, personal computers, desktop computers, laptop computers, mobile telephones, smart phones, tablets, phablets, smart watches, wearable computers, gaming devices/computers, televisions, head-mounted display devices and the like. The internal hardware structure of a client device is discussed in greater detail in regard to FIGS. 6 and 7.

The client device 120 may also include one or more applications 128. Each application 128 may be a computer program executed on the client device 120 that configures the device to be responsive to user input to allow a user to interactively view, generate and/or edit digital content such as content within the electronic document 130. The electronic document 130 and the term "document" used herein can be representative of any file that can be created via an application executing on a computer device. Examples of documents include, but are not limited to, word-processing documents, presentations, spreadsheets, notebooks, email messages, and the like. The electronic document 130 may be stored locally on the client device 120, stored in the data store 142 or stored in a different data store and/or server.

The application 128 may process the electronic document 130, in response to user input through an input device, to create and/or modify the content of the electronic document 130, by displaying or otherwise presenting display data, such as a GUI which includes the content of the electronic document 130, to the user. Examples of suitable applications include, but are not limited to, a word processing application, a presentation application, a note taking application, a text editing application, an email application, a spreadsheet application, an instant messaging application, a communications application, and a collaboration application. The applications 128 may include a communication portal via which the user can communicate with other users. The applications 128 may also provide information about the type of content the user has been accessing and/or working on.

In one implementation, the client device 120 may also include a local communication service 126 for providing some local query responding services when a query is directed to a user of the client device 120 and the user is unavailable to respond. In an example, the local communication service 126 may operate with the access determination service 116 (and/or a local access determination service, not shown) to determine if access can be granted to information in response to a query received from a user such as the user of client device 122. In some implementations, enterprise-based repositories that are cached locally may be used to provide local communication services.

It should be noted that each of the communication service 112, indexing service 114, access determination service 116 and local communication service 126 may be implemented as software, hardware, or combinations thereof.

The communication application 124 of the client device 122 may be utilized to transmit a message to the user of the client device 120. This may be achieved via the network 152 either directly or through the server 110 (e.g., by utilizing the communication service 112). The message may include a query to the user of client device 120. In some implementations, the communication application 124 of the client device 120 may determine if the message includes a query and whether the recipient is unavailable. Upon a determination that the message contains a query and the recipient is unavailable, the communication application may transmit the query to the local communication service 126 and/or communication service 112 for generating an automatic response. Alternatively, examining and processing messages exchanged between client devices 120 and 122 may be performed by the communication service 112, and the communication applications 124 may be mainly utilized for providing a UI for interaction with the user.

Figure 1B:
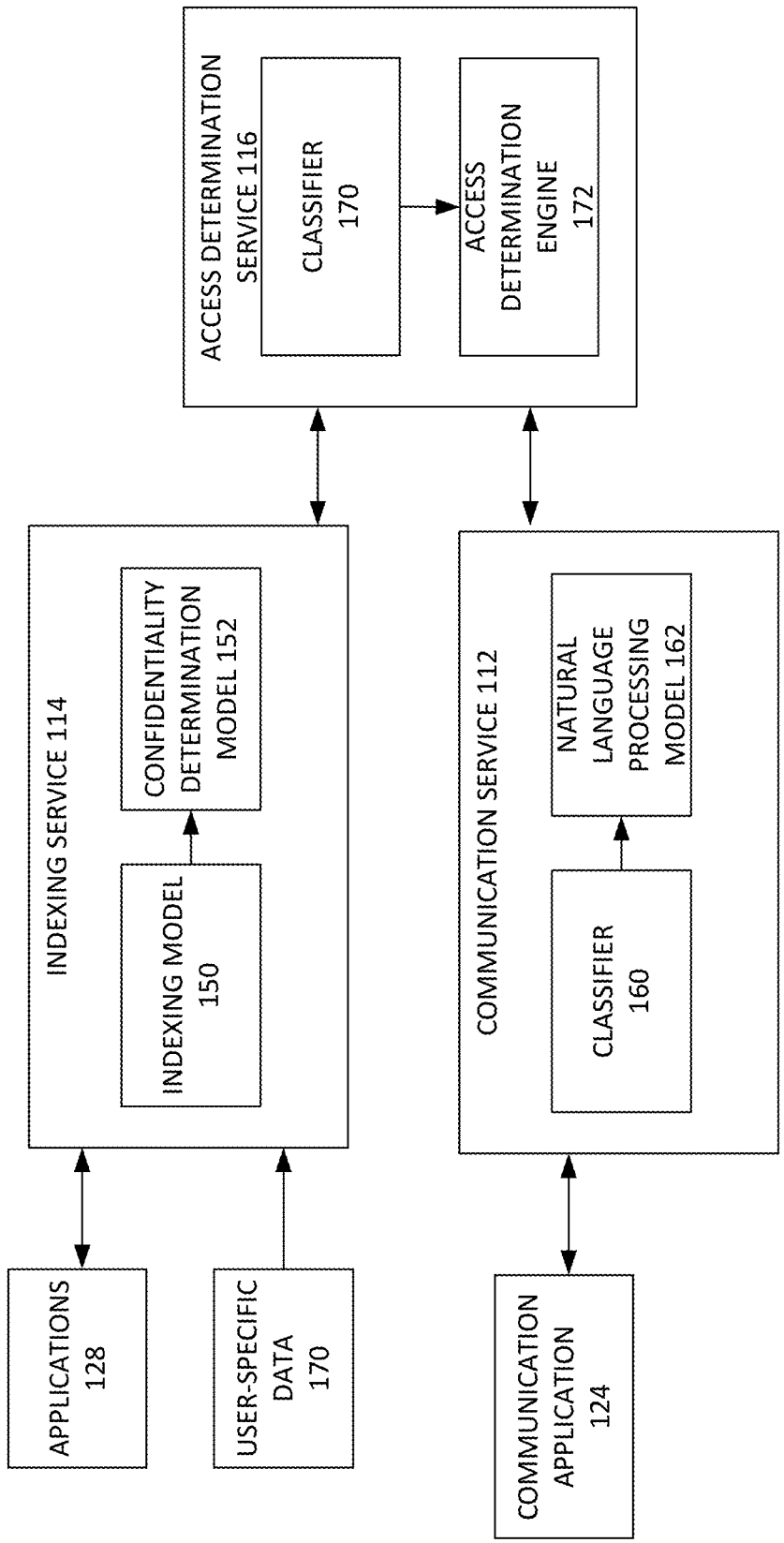

FIG. 1B depicts a system level data flow between some of the elements of system 100. As discussed above, information about a document being accessed, shared, worked on and/or otherwise interacted with by a user via one or more applications 128 may be transmitted to the indexing service 114 to create an index for information that can be utilized when responding to a query. The information transmitted from the applications 128 may be referred to as contextual document data and may include information about the user's interactions with the document (e.g., one or more of the latest actions the user has taken in the document), the role(s) of the user with respect to the document (e.g., author, editor, viewer, etc.), the lifecycle stage of the document (e.g., authoring, editing, reviewing, or viewing stage), a history of users who have interacted with the document, the type of application from which the information was received, the subject matter of the document (which may be or may have been inferred separately and/or in the past by one or more ML models), the type of document (e.g., scientific article, poetry, patent application, etc.), the person(s) to whom it is directed (e.g., the to line of an email message or letter), the overall tone of the document (e.g., formal, causal, and the like), and/or one or more content segments of the document, among others. The contextual document data may be transmitted directly from the document (e.g., metadata stored with the document) and/or may be transmitted from other services that provide the specific type of information (e.g., a tone detection service for providing the overall tone of the document).

In one implementation, in addition to the contextual document data, user-specific data 154 is transmitted to the indexing service 114. The user-specific data 154 may include information about the user creating the content, the type(s) of actions performed by the user within the document (e.g., within a specific time period and/or since document creation), the position of the user within an organization (e.g., the user's job title or department to which the user belongs, if known), the types of documents the user generally creates, edits, reviews and/or views, the user's use history, user profile data (e.g., various profiles within which the user creates content such as work profile, blogger profile, social media profile and the like), the user's associations with other users (e.g., individuals the user often corresponds with, works in the same team with and/or work on the same project with), and the like. In some implementations, some of the information transmitted may be transmitted from the data store 142 and/or other data repositories. The data repository may contain user-specific data about the user. For example, it may contain user profile and/or use history data. The data contained in the data store 142 may be provided as an input directly from the data store 142 or it may be retrieved by applications 128 and then transmitted through the applications 128 to the indexing service 114.

In some implementations, the user can select the types of contextual document data and/or user-specific data that is transmitted for use in responding to queries. For example, the user may be able to indicate that information about specific documents, storage mediums (e.g., specific folders) and/or individuals that should not be transmitted to the indexing service 114. In another example, the user may be able to specify a project and/or subject matter for which information should be shared. In other implementations, an enterprise may have the ability to restrict transmission of information about specific documents, users, projects, and the like.

In one implementation, the contextual document data and/or user-specific data is transmitted to the indexing service 114 at the end of an active user session or when an indication is received that the user is finished with a document. For example, the contextual document data may be transmitted, when the user utilizes an input/output device (e.g. a mouse) coupled to the client device 120 to invoke a UI option to close a document or an application with which it was accessing the document. In another example, the contextual document data may be transmitted, when the user has been inactive for a specified time period or the user utilizes a status notification mechanism to indicate their unavailability. Alternatively, the contextual document data is collected and transmitted in batches, for example, based on a predetermined schedule.

The contextual document data and user-specific data 154 may be transmitted to an indexing model 150 for mapping a degree of association between the received documents and/or information, the user, other documents and/or other individuals. The indexing model 150 may be a trained ML model that is trained to create an association map for the content (e.g., documents) the user has been interacting with (e.g., within the last active session and/or since the last time information for the user was transmitted) based on the recent contextual document data and/or user-specific data 154. The trained indexing model 150 may examine the content (e.g., document), review contextual document data related to the document, review user-specific data 154, and determine based on one or more of the examined parameters, how the document is associated with the user and other individuals. For example, the indexing model 150 may determine that the document relates to a specific project and identify several team members that work on the project. Based on this information and previous patterns, the indexing model 150 may determine that all team members on the project have a first degree of association with the document.

In addition to creating a degree of association map, the indexing model may also identify and create other labels for the content. For example, the indexing model 150 may determine based on the latest lifecycle of the document and/or other information (e.g., information gleaned from the content of the document or from an email related to the document) that the document has been finalized. For example, an email to which the document was attached may indicate that the document was reviewed by all of the emailer's recipients. This information may then be processed to determine its degree of association with one or more individuals. This may involve aggregation of information and creating a mapping between segments of information. For example, it may involve determining how various information are associated with each other (e.g., how are they linked and based on how many degrees of association). Thus, the indexing model 150 may receive contextual document data and/or user-specific data as input and may provide as a degree of association map and/or other labels for specific content as an output.

The degree of association maps and/or other labels may be provided by the indexing model 150 to a confidentiality determination model 152. The confidentiality determination model 152 may be a trained ML model which is trained to identify, for various types of content and/or information, based on the associations maps and/or other labels, different groups of users having various levels of confidentiality with respect to the content. In one implementation, determining the confidentiality levels and groups includes examining the contextual document data. For example, if a document includes content that indicates the subject matter is highly confidential (e.g., it includes a confidentiality header or relates to a project determined to be confidential), the confidentiality groups may be limited to one level which includes users with a first degree of association with the document and/or users who have been indicated as having a certain level access to confidential information. Thus, the confidentiality determination model 152 may determine based on the associations maps, contextual document data, user-specific data and/or other labels, individuals that may have access to the content and their allowed level of access. Level of access may include levels such as read-only, read-write and the like for access to a document, or may include the type of information that can be shared with respect to the user and/or a document. For example, groups of users having a top level of access with respect to the user may be able to get access to information derived from the user's emails (e.g., status of a project, topics of upcoming meetings, the last time the user checked their emails, and the like), while groups of users having lower level access may only be granted to more public information such as the user's latest role with respect to a document (e.g., author, reviewer, etc.). Thus, the confidentiality determination model 152 may receive associations maps, contextual document data, user-specific data and/or other labels as input and may provide confidentiality groups having one or more users for specific documents and/or information as an output. In some implementations, the indexing model 150 and the confidentiality determination model 152 are combined and function as a single ML model. Alternatively, each of the indexing model 150 and the confidentiality determination model 152 may include one or more other ML models.

The information indexed and categorized by the indexing service 114 may be utilized by the communication service 112, when a query is directed to an unavailable user. This may involve receiving an input (e.g., a message directed to the user of client device 120) from a communication application 124 of the client device 122. If a response to the message is not provided within a given time period (e.g., 10 minutes) or it is otherwise determined that the recipient is unavailable to respond (e.g., via a status notification such as an out of office notice or a specific period of inactivity), the communication service 112 may begin examining the message to determine if it is a query to which a response can be provided in the absence of the recipient. This may involve utilizing a classifier such as the classifier 160 to determine if the message includes a question or request. The classifier 160 may receive the message as an input and examine the content of the message for specific characters (e.g., a question mark) or specific phrases (e.g., send me) to determine if it includes a question and/or a request. Alternatively or additionally, the classifier 160 may utilize a natural language processing (NLP) algorithm to classify the message.

Once the message has been classified as a query containing a question and/or a request, it may be transmitted to the NLP model 162 for further processing. This NLP model 162 may utilize NLP techniques such as the Automated Question Answering (AQA) technique to identify the type of information and/or document that needs to be accessed to provide a response to the query. As is known by persons of skill in the art, models for performing human-level question and answering can be trained by supervised learning approaches using data sets such as the Standard Question Answering Dataset (SQuAD), which is a reading comprehension data set containing various questions and answers. Thus, the NLP model 162 may receive a question or request contained in a message as an input and provide the type of information and/or document that needs to be accessed to provide a response to the query as an output. For example, the NLP model 162 may determine that the query relates to a specific document (e.g., the status of a document) based on the content of the message. This information may be transmitted to the access determination service 116 for further processing.

The access determination service 116 may include a classifier 170 for classifying the type of information to which access is required for responding to the query. The classifier 170 may classify the information as relating to a document, to information, and/or to social interaction. For example, when the message contains the question "are you available tomorrow morning for a meeting", the classifier 170 may classify the query as relating to social interaction. However, if the query contains the question "what is the status of the user manual document", the classifier 170 may classify the query as relating to a document. This classification may assist in making a high level determination as to whether a response can be provided. For example, when the question relates to social interaction "e.g., are you available tomorrow morning for a meeting?" and access to the recipient's calendar is available to the requester, the question may simply be answered using the recipient's calendar.

The classification information may be provided to the access determination engine 172 for determining whether access to the information is available to the requester. This may involve receiving input regarding the requester (e.g., a user ID associated with the requester), receiving information about the type of content (e.g., document, information, etc.) to which access is required for responding to the request, and retrieving the confidentiality groups and/or association maps related to the requested content to determine whether access should be granted to the requester. In one implementation, this process may involve use of one or more ML models. Alternatively, the access determination engine 172 may simply make use of the classification(s) and/or confidentiality groups to determine if access should be granted to the information. Thus, the access determination service 116 may receive a request for accessing information as an input and may provide a determination as to whether access can be granted to the information as an output. The output may be provided back to the communication service 112, which may, transmit the NLP model 162 to create a response to the query based on whether or not access is granted, the level access, among other factors. The communication service 112 may then transmit the prepared response to the communication application 124 of the client device 122 for being displayed to the requester.

It should be noted that, in some implementations, the operations of the indexing service 114, the access determination service 116 and/or communication service 112 are combined. For example, the operations of the indexing service 114 and the access determination service 116 may be provided by one combined service.

Figure 1C:
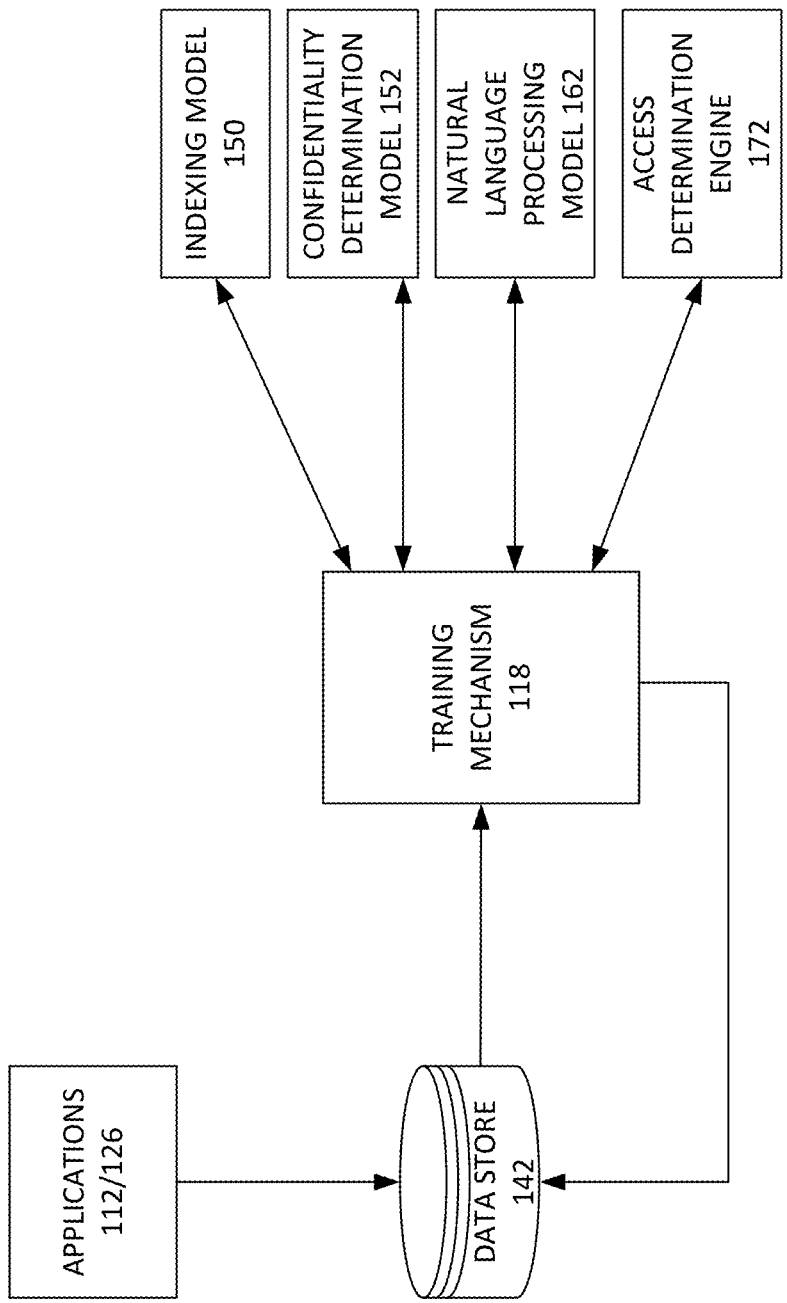

FIG. 1C depicts how one or more ML models used by the communication service 112, indexing service 114 and access determination service 116 may be trained by using the training mechanism 118. The training mechanism 118 may use training data sets stored in the data store 142 to provide initial and ongoing training for each of the models included in the communication service 112, indexing service 114 and access determination service 116. For example, each of the indexing model 150, confidentiality determination model 152, NLP model 162 and models within the access determination engine 172 may be trained by the training mechanism 118 using corresponding data sets from the data store 142.

The indexing model 150, confidentiality determination model 152 and/or ML models within the access determination engine 172 may be trained by using labeled training data which include confidentiality (e.g., confidentiality groups and/or access levels) as a label. The training data may include various types of contextual document data, and user-specific data, user associations and/or confidentiality groups as parameters. The labeling process may be performed by users. In some implementations, training data sets is augmented with confidentiality labels which may be provided by a platform such as the Microsoft Graph. In some implementations, the training data includes user data collected during use of various applications. The labeled training data may then be used in a supervised learning process to train the indexing model 150, confidentiality determination model 152 and/or ML models within the access determination engine 172. It should be noted that in collecting and storing training data and training the ML models care is taken to ensure users privacy is protected.

The NLP model 162 may be trained using a supervised learning process by using labeled data. The labeled data may include data sets that include confidentiality labels. As discussed above, the training may be achieved by utilizing AQA NLP techniques. Additionally, further training may be provided by utilizing unsupervised question answer training. Training of the NLP model 162 may also involve utilizing Machine Learning Comprehension (MRC) techniques.

To provide ongoing training, the training mechanism 118 may also use training data sets received from each of the trained ML models. Furthermore, data may be provided from the training mechanism 118 to the data store 142 to update one or more of the training data sets in order to provide updated and ongoing training. Additionally, the training mechanism 118 may receive training data such as knowledge from public repositories (e.g., Internet), knowledge from other enterprise sources, or knowledge from other pre-trained mechanisms.

Figure 2A:
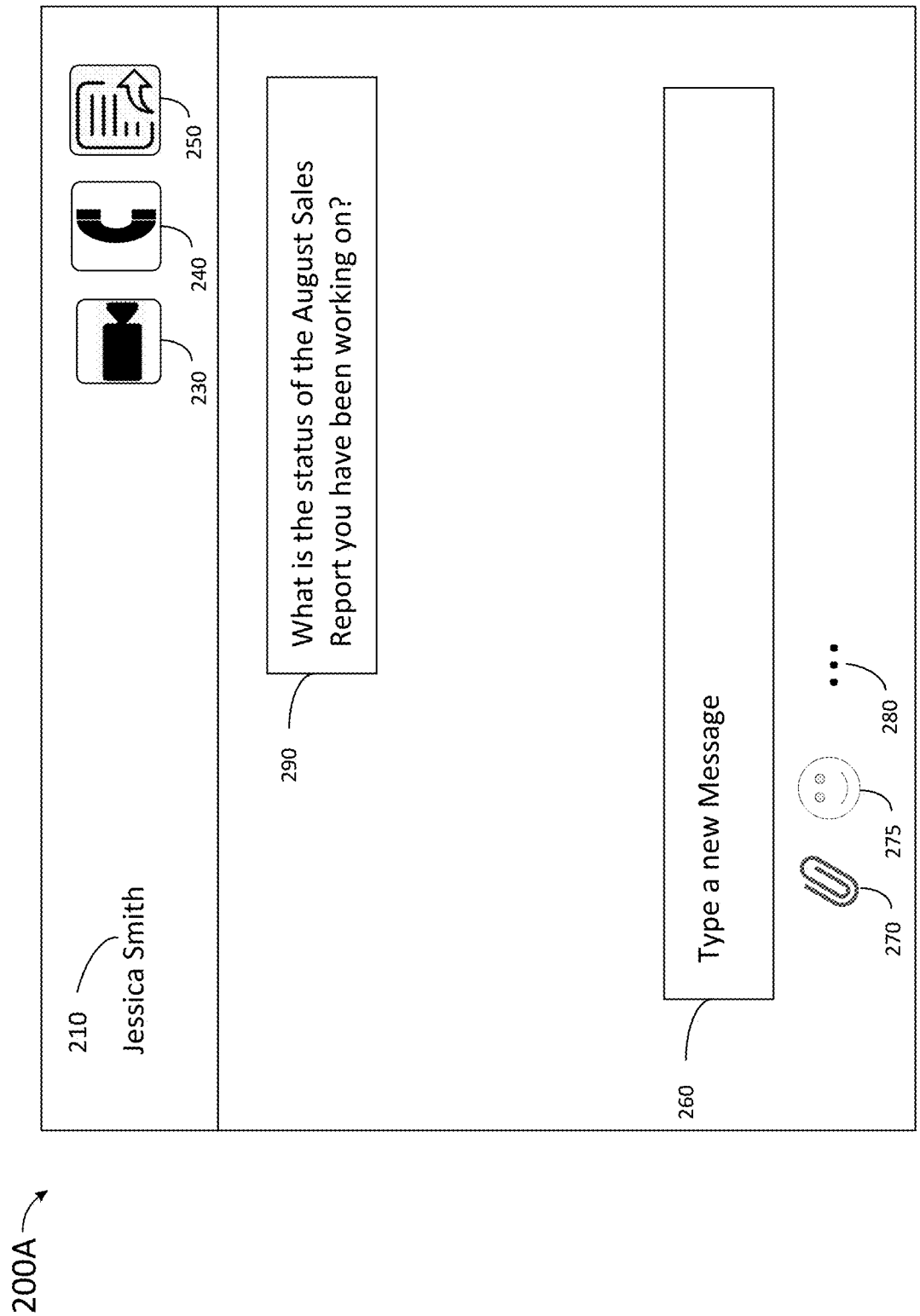
FIGS. 2A-2C are example graphical user interface (GUI) for intelligently responding to queries directed to a user when the user is not available to answer the queries.
Figure 2B:
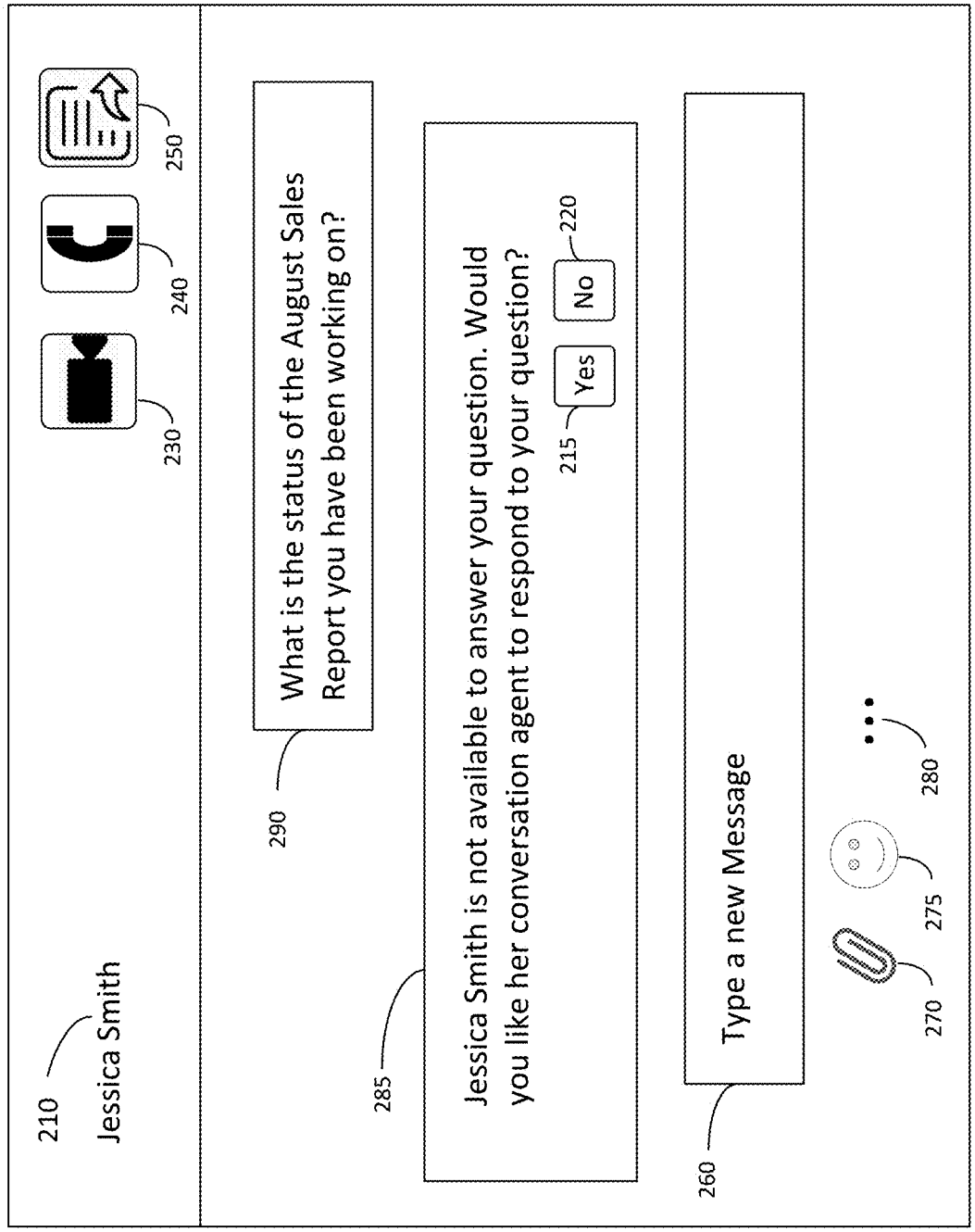
Figure 2C:
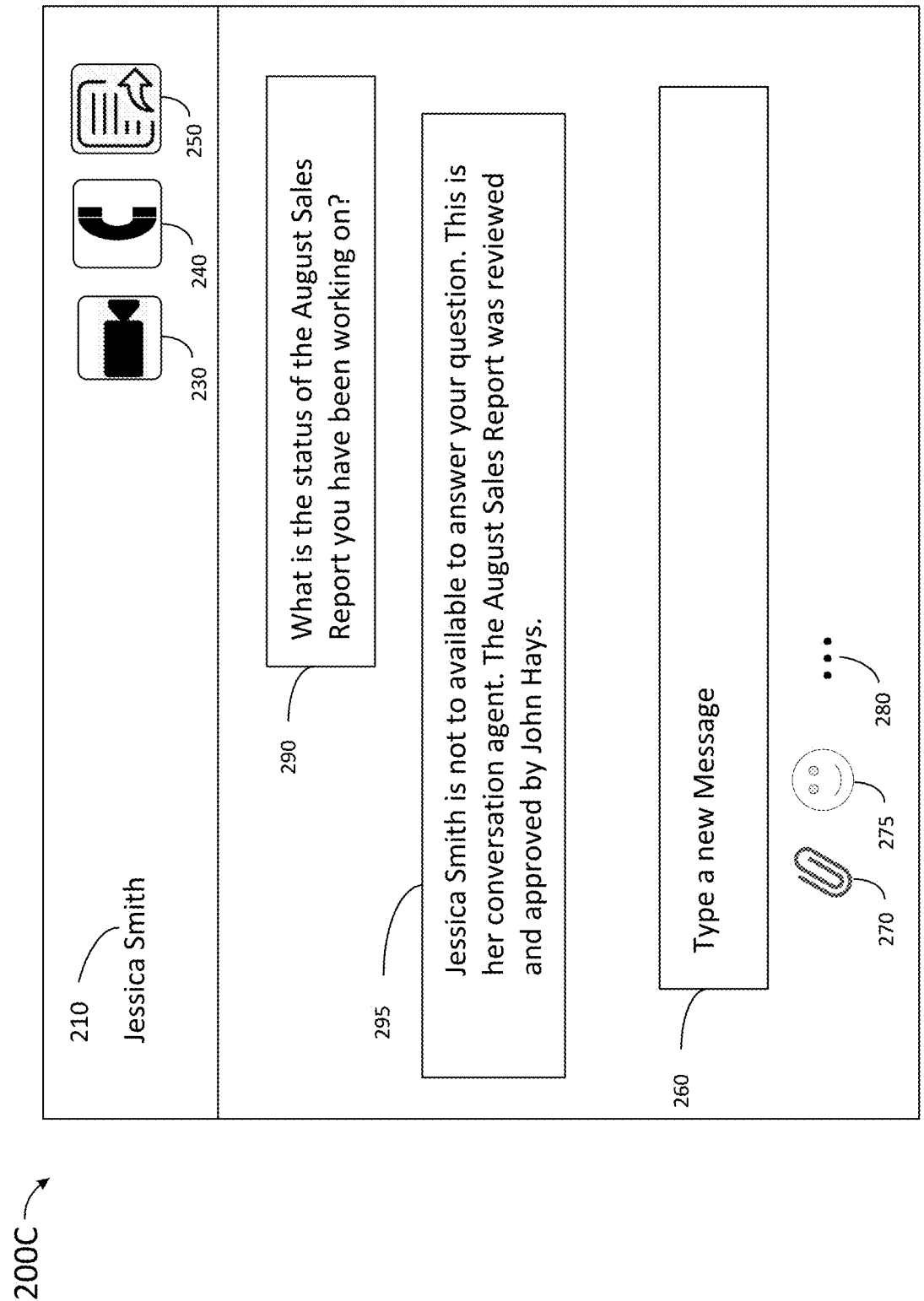

FIG. 2A-2C are example GUI screens for intelligently responding to queries directed to a user when the user is not available to answer the queries. The GUI screen 200A of FIG. 2A may be a GUI displayed by a communication application such as an instant messaging application for establishing instant communications between the user and a contact named Jessica Smith. In one implementation, the GUI screen 200A is displayed by the messaging application (e.g., communication application 124 running on the client device 122). Alternatively, the GUI screen 300A may be shown via an online messaging service.

The GUI screen 200A may include a GUI element 210 for displaying the name of the contact with which the user is communicating. The GUI screen 200A may also include a menu button 230 for engaging in a video conference with the contact, a call button 240 for initiating a VoIP audio call with the contact, and a share screen button 250 for share a document or a screen with the contact. Thus, although GUI screen 200A displays an instant messaging scenario, the same communication application may be used to engage in instant messaging, video conferencing, VOIP calling, sharing of a screen with a contact and other functions. In this manner, communications containing unresolved queries may be detected and tracked from various communication channels, as discussed further below.

The GUI screen 200A may also include a UI element 260 for entering input (e.g., text) to be shared with the contact. Thus, the user of the GUI screen 200A may enter a text in the UI element to send as an instant message to the contact identified by UI element 210. In addition to entering text into the UI element 260, the user may utilize other menu options such as a menu button 270 for attaching a file or menu button 275 for entering an emoticon into the UI element 260. The GUI screen 200A may also include a menu button 280 for displaying a context menu which provides other options such as sending a video message, creating a poll and others.

Upon entering input into the UI element 260 and pressing enter or clicking on a share button (not shown), the entered text may be displayed within the GUI screen 200A as a sent message in a UI element such as the UI element 290. Furthermore, the message may be transmitted to a communication application on the recipient (e.g., communication application 124 of client device 120). Alternatively, the message may be transmitted to a communication service (e.g., communication service 112) which may determine if the recipient is available to respond before forwarding the message to the recipient. When the message is forwarded to the recipient and a response is not received within a given time period and/or a determination is made that the recipient is unavailable (e.g., out of office indication is on, the recipient has been inactive, their communication application is closed, and the like), the message may be examined to determine if it contains a query, as discussed above.

When it is determined that the message includes a query, the communication service may determine if the person who submitted the message can access the requested information. Based on this determination, the communication service may automatically create a response to the query. In some implementations, an indication may first be displayed to the sender to notify the sender that the recipient is not available and ask the sender if they would like to receive a response from the conversation agent, as illustrated in the GUI screen 200B of FIG. 2B. For example, a UI element 285 may be utilized to provide a notification that the recipient is unavailable and ask the sender to provide input as to whether they are interested in the conversation agent providing a response. The sender may then be able to utilize the UI elements 215 to indicate their desire to receive a response from the conversation agent or utilize the UI element 220 to choose not to receive a response from the conversation agent.

Once the sender indicates that they are interested in receiving a response from the conversation agent or in implementations where no notification is presented, the response may be displayed to the sender, as illustrated in the GUI screen 200C of FIG. 2C. For example, a UI element 290 may be utilized to provide a notification that the recipient is unavailable and/or provide the requested information. In this manner, a response to the question regarding the status of a document the recipient has been working on can be provided automatically to indicate that the document was reviewed and approved. If the query includes a request instead of a question (e.g., can you please send me the August Sales Report you have been working?) and it is determined that the sender belongs to a confidentiality group that can access the document, the response may include a link to the document. Alternatively, the document may be attached and sent via a UI element such as the UI element 295.

Figure 3A:
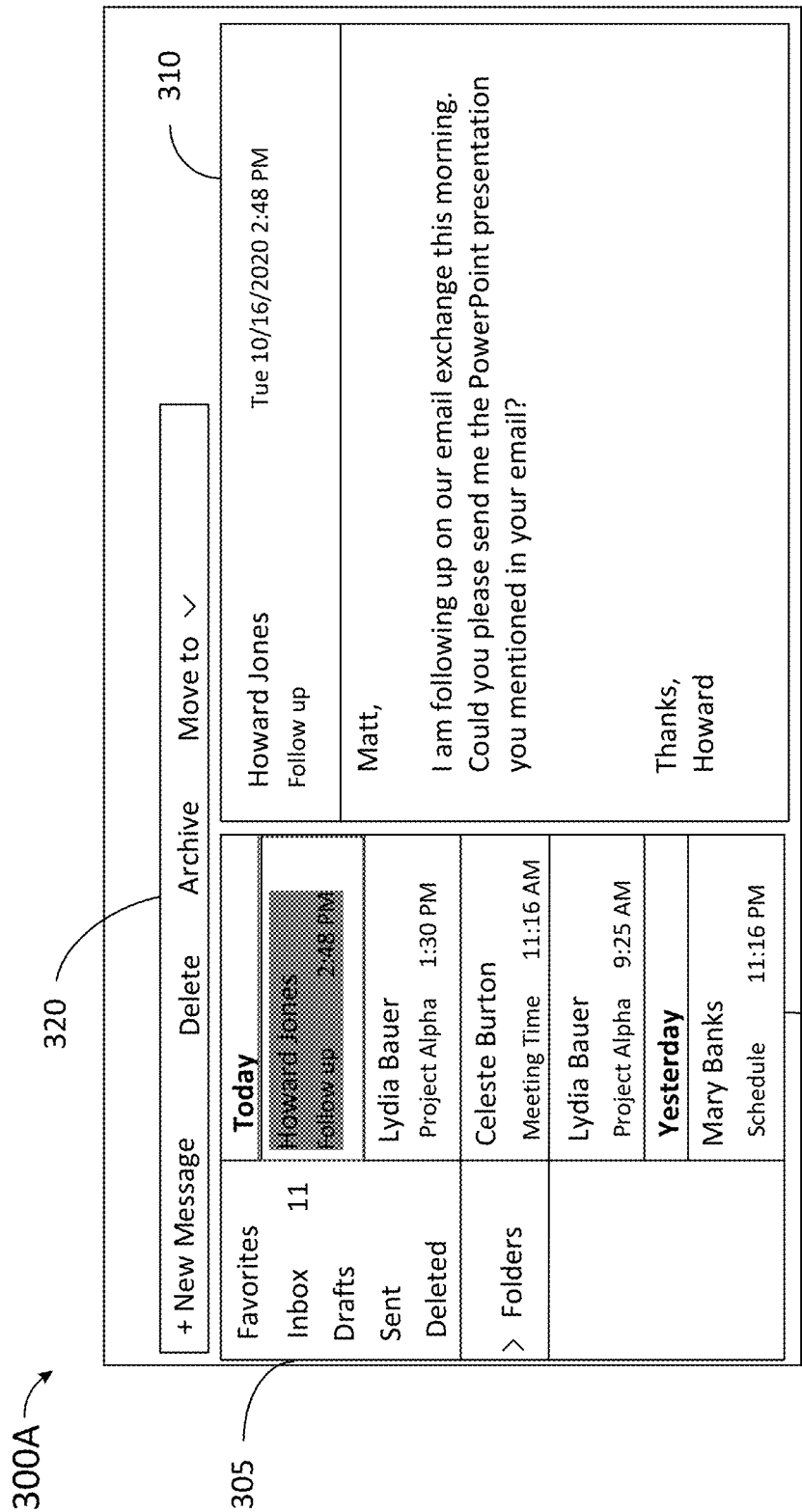
FIGS. 3A-3B for intelligently providing a response to a query submitted via an email communication application.
Figure 3B:
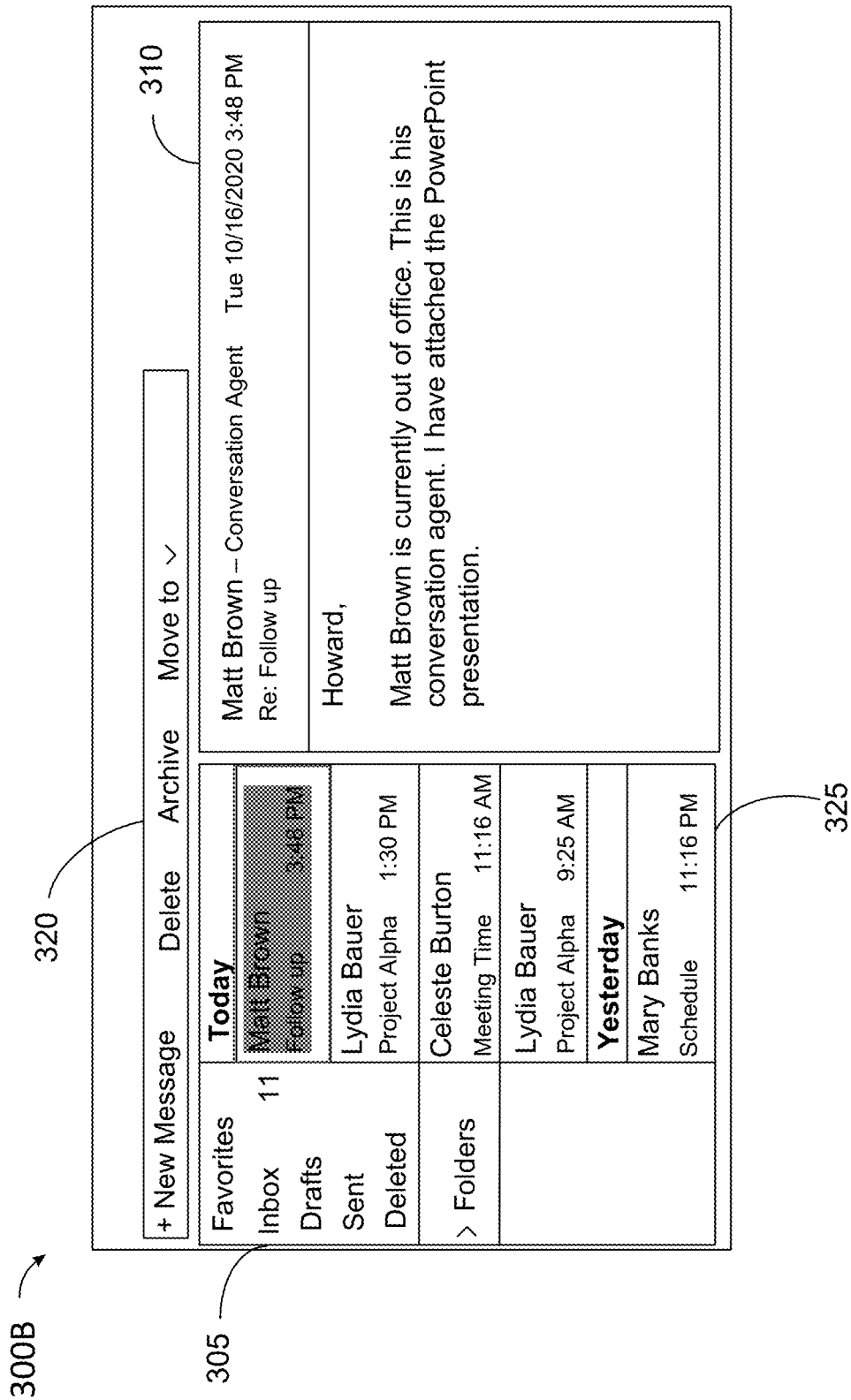

FIGS. 3A-3B are example GUI screens for intelligently providing a response to a query submitted via an email communication application. The GUI screens of FIGS. 3A-3B may include a mailbox menu pane 305 which contains links for accessing different folders in the mailbox and a summary email pane 325 containing a list of emails with certain identifying information such as the senders, titles and date/time of the emails. The email selected from the summary email pane 325 is highlighted (i.e., has a gray background) to indicate that this is the email shown in the email pane 310. The GUI screens 300A and 300B may also include a tool bar 320 containing various links for menu options.

To provide an intelligent response to a query contained in an email when the recipient is unavailable, the email communication application and/or communication service may first determine if a response to the email is not provided within a given time period and/or the recipient is otherwise determined to be unavailable. In some implementations, different communication applications may use different time periods to indicate recipient unavailability. For example, an instant communication application may flag the recipient as unavailable if a response is not received within 10 minutes, while an email communication may flag the recipient as unavailable is a response is not provided within 1 hour.

Once the recipient is flagged as being unavailable, the email communication application and/or communication service may examine the contents, context and/or other parameters of an email received to determine if the email contains a query and as such requires a follow up. To do so first the contents of the email may be examined using one or more text analysis algorithms and/or classifiers, as discussed above, to determine if the email includes a question or request. Subsequently, other parameters may be examined to determine if the email requires a follow up. For example, in addition to merely checking contents of emails, the application/service may also examine other parameters such as whether any keywords indicating urgency (e.g., urgent, asap) are included, whether a flag indicating high importance is assigned to the email and/or whether the sender and/or the receiver has marked the email as requiring follow up.

Once the email communication application/service determines that an email contains a question and requires follow up, it may transmit a notification to the sender that the recipient is unavailable. The notification may be in the form of an email (e.g., similar to out of office emails) that notifies the sender that the recipient is unavailable or may be displayed as a pop-up menu option. In some implementations, the notification may provide an option for the sender to receive an automatic response from the conversation agent.

Once the sender indicates a desire to receive an automatic response and/or in implementations where the sender is not provided with an option to select, a determination may be made as to whether access to the requested information can be provided to the sender and a response may be subsequently provided to the sender, as displayed in GUI 300B of FIG. 3B. The response may be in the form of an email received from the recipient and/or their conversation agent.

It should be noted that each user may have the ability to identify the types of documents and information that can be shared with other users. For example, a user may be able to choose specific individuals to share information with and specify the types of documents and/or information they may have access to. A user may also be able to select to opt out of the process if they do not desire to share any information with others. Alternatively, a user may indicate specific applications, documents, and/or applications for which they permit sharing of information.

Figure 4A:
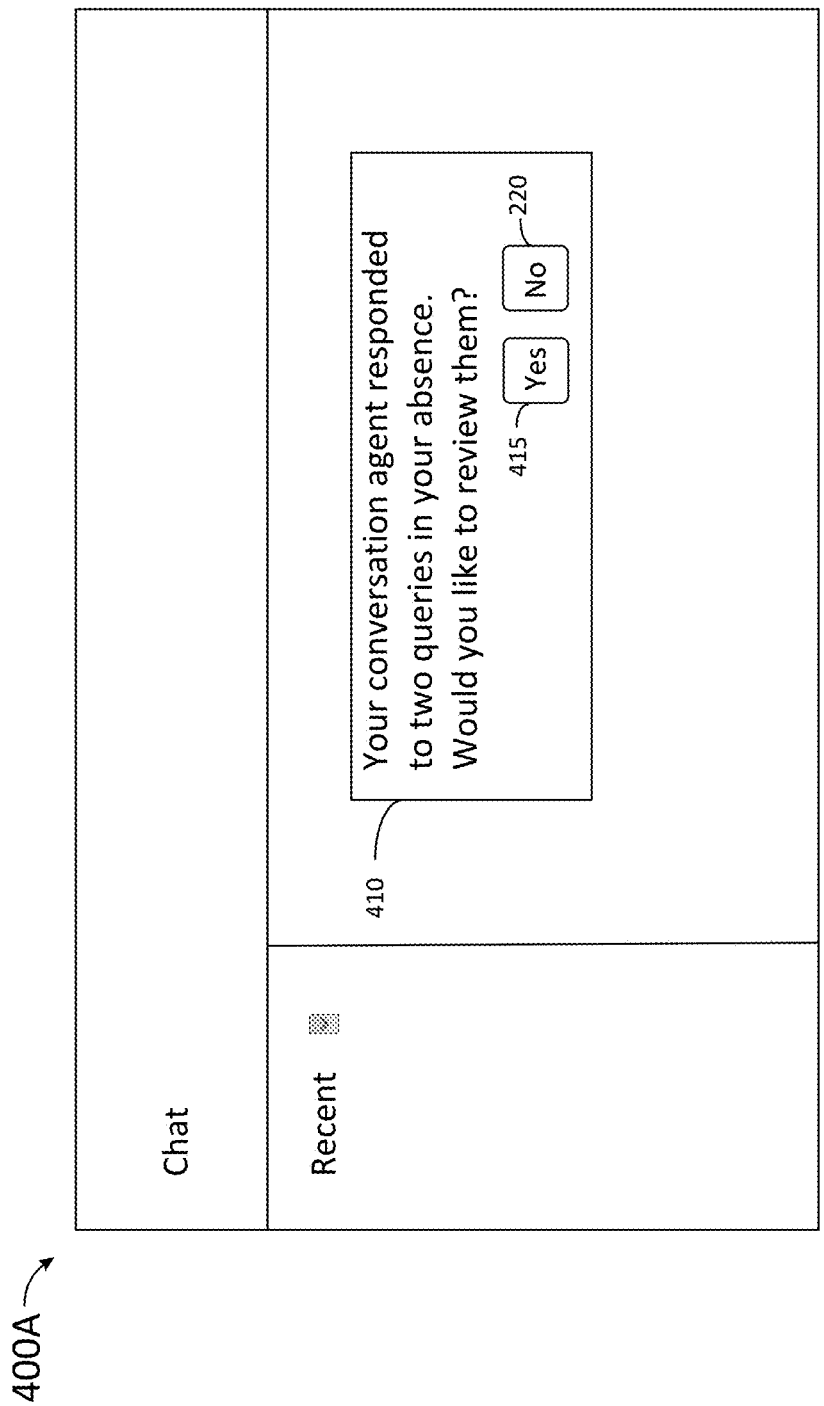
FIGS. 4A-4B are example GUI screens for notifying a user of activities performed by their conversation agent in their absence.
Figure 4B:
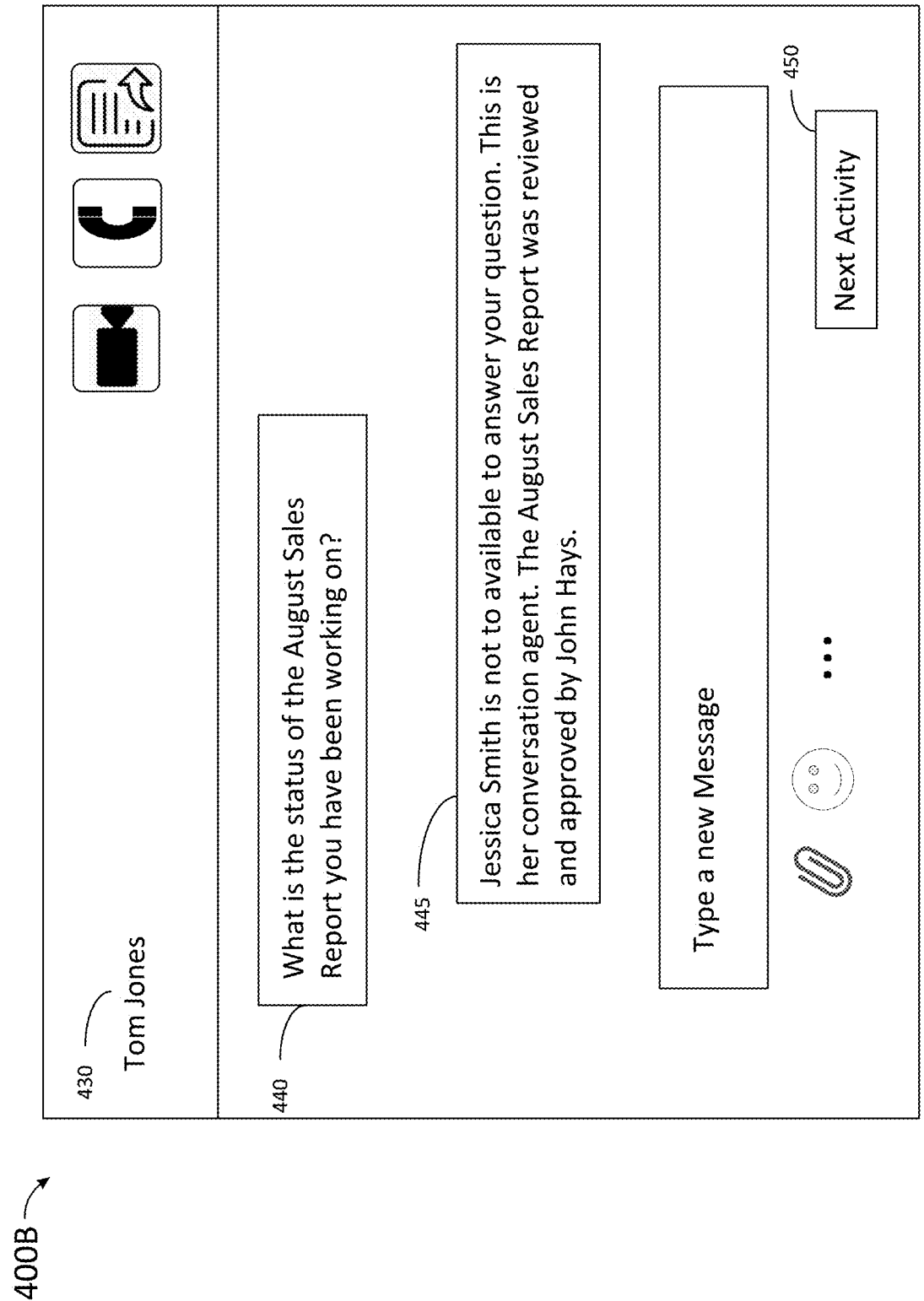

In some implementations, when a conversation agent is utilized to respond to a query, the unavailable recipient may be notified of the correspondence conducted in their absence. For example, the next time the recipient opens the communication application, a pop-up menu may be displayed to notify them of activities performed by their conversation agent in their absence. FIGS. 4A-4B are example GUI screens for notifying a user of activities performed by their conversation agent in their absence. As illustrated, in GUI screen 400A of FIG. 4A, a UI element 410 may be utilized to notify the user that their conversation agent responded to one or more queries in their absence. The UI element 410 may also enable the user to choose to review the activities by providing UI elements 415 and 420. Selecting the UI element 420 may indicate that the user is not interested in reviewing the activities, while choosing the UI element 415 may indicate the user's desire to review the activities. Once the user indicates a desire to review the activities, a GUI such as the GUI screen 400B may be presented to display one of the exchanges involving the conversation agent.

The GUI screen 400B may display similar features as those displayed in FIGS. 2A-2B for conducting instant communications. Additionally, the GUI screen 400B may display the name of the person from who the query was received by utilizing a UI element 430. The contents of the query may be displayed by utilizing a UI element 440, and the response provided may be displayed via a UI element 445. In some implementations, each of the UI elements 440 and 445 may also include a date and/or time at which the message was received/sent. When more than one query was responded to, the GUI screen 400B may include a UI element 450 for viewing the next query. In this manner, the user may be notified of all documents and/or information provided in the user's absence. This may assist the user in correcting any mistakes in the response or in following up with the sender. Furthermore, the notification may enable the user to identify potential unauthorized requests for information.

In some implementations, in order to prevent potential phishing attempts, limits may be placed on the number of queries responded for each recipient in a given time period. For example, when a sender transmits more than 5 messages containing queries within an hour, the communication service may pause responding to their queries. In some implementations, the communication service may notify the recipient via other mechanisms (e.g., via email, text message, or other notification on their mobile device) that an individual has transmitted more than 5 queries in the last hour.

It should be noted that other methods of presenting a notification may also be employed. For example, once the user begins an active session at the client device, the notification may be presented to the user on any UI screen being currently displayed to the user. In one implementation, the notification may be presented to the user, even if the user is currently viewing a screen of a different application. For example, the notification may be presented as a task bar menu notification.

It should also be noted that the communications applications via which users communicate may collect information as the users interacts with each other to better train the ML models used in providing intelligent query responses. For example, when a query is received from a sender, the query and recipient's response may be collected to be used in providing ongoing training for the models. In collecting and storing this information, care must be taken to ensure privacy is persevered.

To ensure compliance with ethical and privacy guidelines and regulations, in one implementation, an optional UI element may be provided to inform the user of the types of data collected, the purposes for which the data may be used and/or to allow the user to prevent the collection and storage of user related data. The UI may be accessible as part of features provided for a communication application via a GUI displayed by the application when the user selects an options menu button. Alternatively, the information may be presented in a user agreement presented to the user when they first install the application.

Figure 5:
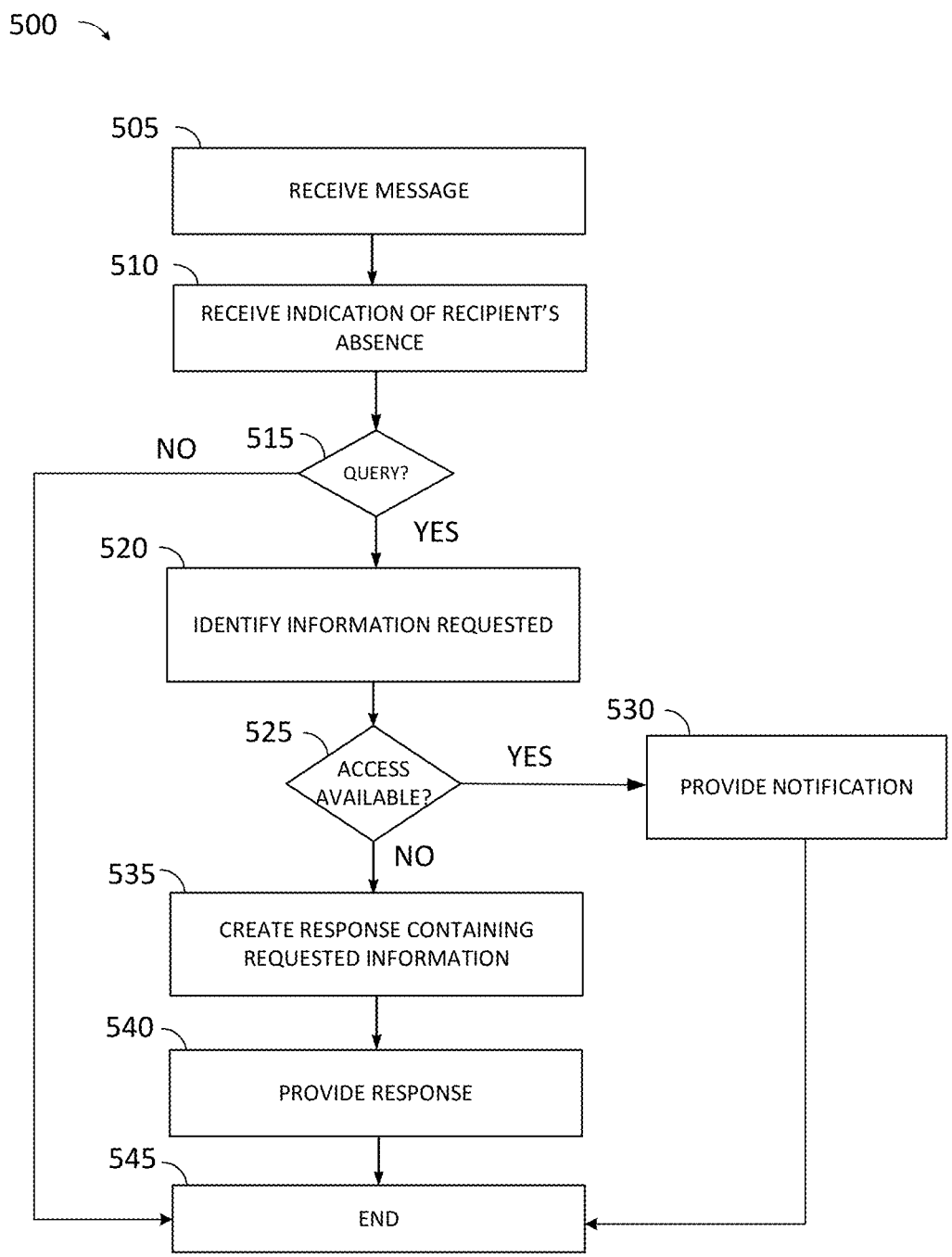
FIG. 5 is a flow diagram depicting an example method for intelligently responding to a query directed to a user who is not available to answer the query.

FIG. 5 is a flow diagram depicting an exemplary method 500 for intelligently responding to a query directed to a user who is not available to answer the query. In an example, one or more steps of method 500 may be performed by communication applications (e.g., communication applications 124 of FIGS. 1A-1B), a communication service (e.g., communication service 112 of FIGS. 1A-1B), an indexing service (e.g., indexing service 114 of FIGS. 1A-1B) and/or an access determination service (e.g., access determination service 116 of FIGS. 1A-1B).

At 505, method 500 may begin by receiving a communication message directed to a recipient. As discussed above, the message could be received via a communication application and/or any other application that enables exchange of messages between users. The message could be a written or voice message (in which case the voice message may be converted to text before further processing). After receiving the message, an indication may be received that the recipient of the message is unavailable to respond to the message, at 510. As discussed above, the indication may be received upon determining that the recipient has not responded to the message within a given time period, the recipient is utilizing a presence status indicator (e.g., out of office notification or presence status of an instant messaging application) to indicate he/she is unavailable, when the recipient has been inactive for a given time period, and/or when the communication application of the recipient is not opened on their device.

Once an indication is received that the recipient is unavailable, method 500 may proceed to determine if the received message contains a query, at 515. This may involve use of text analytics algorithms. The text analytics algorithms may include natural language processing algorithms that allow topic or keyword extractions, for example, in the areas of text classification and topic modeling. Examples of such algorithms include, but are not limited to, term frequency-inverse document frequency (TF-IDF) algorithms and latent Dirichlet allocation (LDA) algorithms. Topic modeling algorithms may examine the message to identify and extract salient words and items that may be recognized as requests for information and/or documents.

When it is determined that the message does not include a query (no at 515), method 500 may proceed to end, at 545. However, if it is determined that the message includes a query (yes at 515), method 500 may proceed to identify the information requested, 520. This may also involve the use of text analytics algorithms such as the ones discussed above. When the requested information and/or document is identified, method 500 may proceed to determine if access to the requested information and/or document is available to the sender, at 525. This may require examining the sender's credentials to determine if the user is among a group of users that have access to the requested information and/or document, as discussed above in more details.

If it is determined that access to the requested information and/or document is not available to the sender (no at 525), method 500 may proceed to provide a notification to the sender 530. The notification may simply include a statement that the conversation agent cannot respond to the request. Alternatively, the notification may state that access to the information cannot be provided by the conversation agent and/or that the recipient's permission is required. After providing the notification, method 500 may proceed to step 545 to end.

When, however, it is determined that access to the requested information and/or document is available to the user (yes at 525), method 500 may proceed to create a response containing the requested information, at 535. This may involve use of one or more NLP models that utilize AQA techniques to generate a human-level response that includes the requested information and/or document. Once the response is generated, display data containing the response may be transmitted to the sender's device such that the response can be displayed to the sender, at 540. The response may be displayed via the communication application used by the sender to send the initial message. In implementations where the initial message is a voice message, the response may be converted to voice before being presented to the sender. Once the response is provided to the sender, method 500 may end, at 545.

Figure 6:
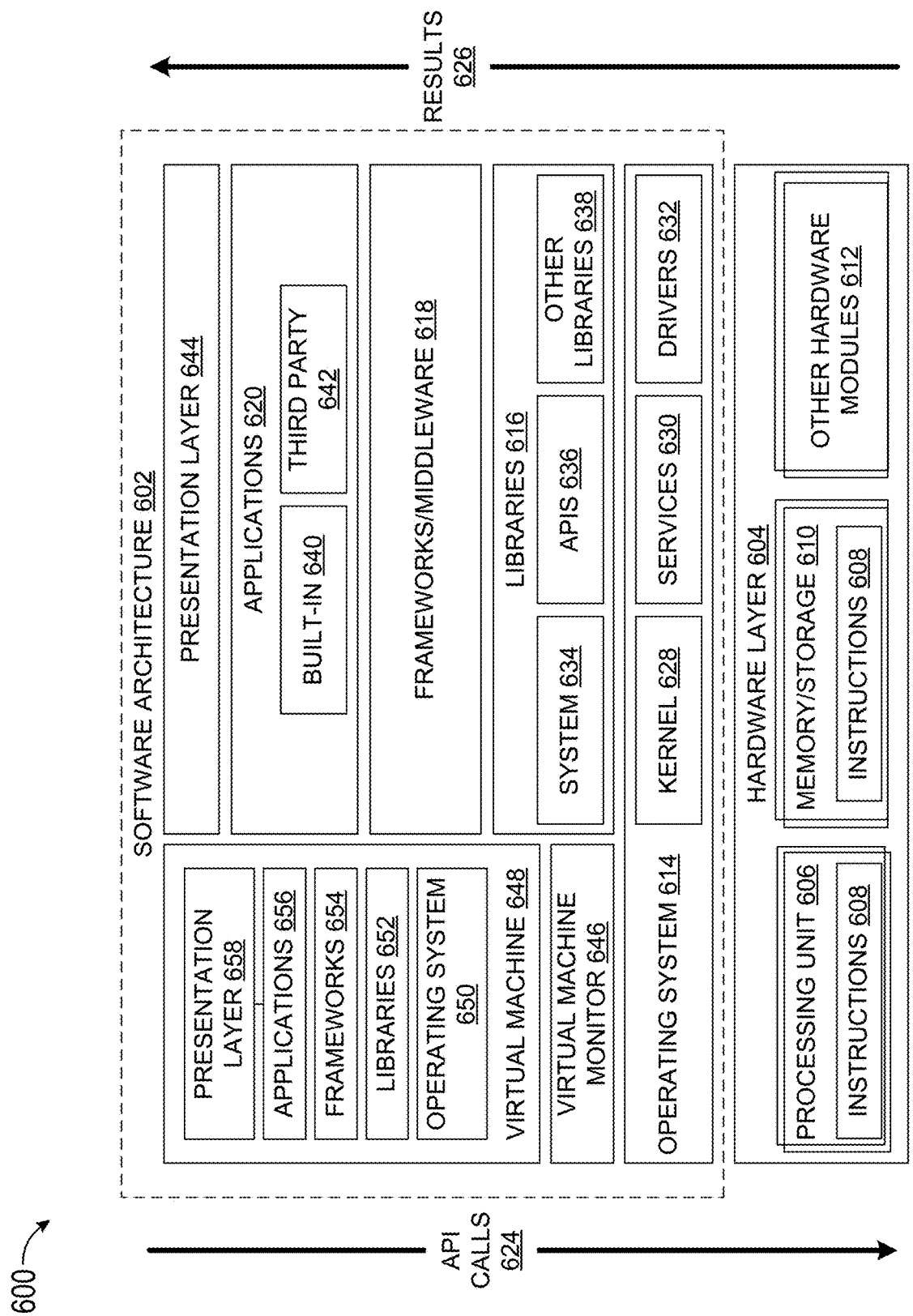
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 748 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
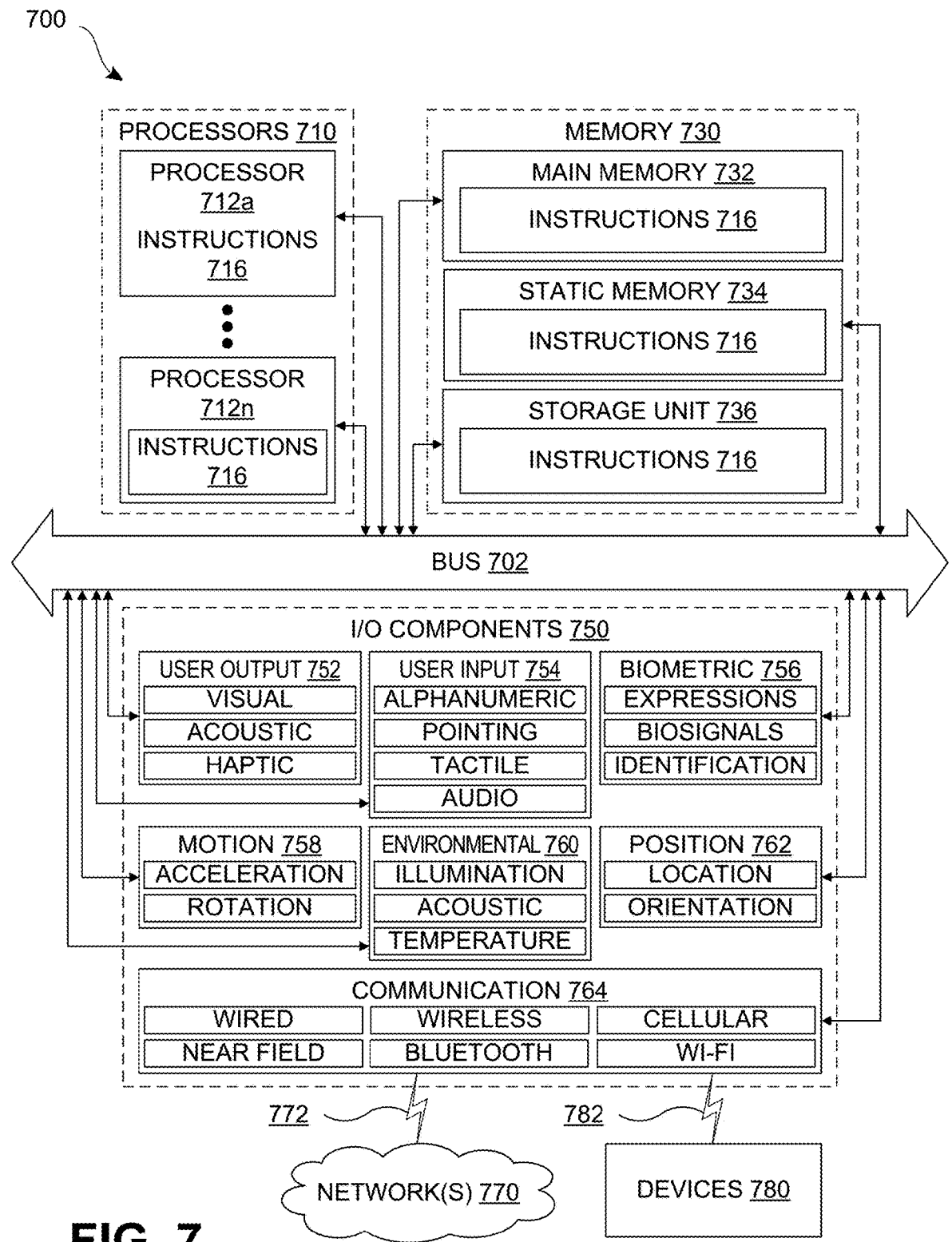
FIG. 7 is a block diagram illustrating components of an example machine configured to read instructions from a machine-readable medium and perform any of the features described herein.

FIG. 7 is a block diagram showing components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 816.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
    a processor; and
    a memory in communication with the processor, the memory comprising executable instructions that, when executed by the processor, cause the data processing system to perform functions of:
    receiving a message from a sender directed to a recipient, the message including a query;
    receiving an indication that the recipient is unavailable to respond to the query;
    providing the query as an input to a machine-learning (ML) model to identify information requested in the query;
    obtaining the information requested as an output from the ML model;
    determining if access to the information requested is available to the sender, based at least on a confidentiality group to which the sender belongs with respect to the information requested, the confidentiality group to which the sender belongs with respect to the information requested being determined based on a degree of association between the sender and the information requested;
    upon determining that access to the information requested is available, generating a response to the query, the response including the information requested; and
    providing the response to the sender.

Item 2. The data processing system of item 1, wherein the instructions further cause the processor to cause the data processing system to perform functions of determining if the message contains a query.

Item 3. The data processing system of item 2, wherein the instructions further cause the processor to cause the data processing system to perform functions of determining if the query relates to a document, to social interaction, or to other information.

Item 4. The data processing system of any one of the preceding items, wherein the ML model includes a natural language processing (NLP) model.

Item 5. The data processing system of any one of the preceding items, wherein the instructions further cause the processor to cause the data processing system to perform functions of providing a notification to the recipient of the response to the query.

Item 6. The data processing system of any one of the preceding items, wherein the degree of association between the sender and the information requested is determined by creating an association map between information, one or more documents or one or more users based at least in part on contextual document data and user-specific data.

Item 7. The data processing system of any one of the preceding items, wherein the response to the query is generated by using NLP model.

Item 8. A method for responding to a message directed to a recipient, comprising:
receiving the message from a sender, the message including a query;
receiving an indication that the recipient is unavailable to respond to the query;
providing the query as an input to a machine-learning (ML) model to identify information requested in the query;
obtaining the information requested as an output from the ML model;
determining if access to the information requested is available to the sender, based at least on a confidentiality group to which the sender belongs with respect to the information requested, the confidentiality group to which the sender belongs with respect to the information requested being determined based on a degree of association between the sender and the information requested;
upon determining that access to the information requested is available, generating a response to the query, the response including the information requested; and
providing the response to the sender.

Item 9. The method of item 8, further comprising determining if the message contains a query.

Item 10. The method of item 9, further comprising determining if the query relates to a document, to social interaction, or to other information.

Item 11. The method of any one of items 8-10, wherein the ML model includes a natural language processing (NLP) model.

Item 12. The method of any one of items 8-11, further comprising providing a notification to the recipient of the response to the query.

Item 13. The method of any one of items 8-12, wherein the degree of association between the sender and the information requested is determined by creating an association map between information, one or more documents or one or more users based at least in part on contextual document data and user-specific data.

Item 14. The method of any one of items 8-13, wherein the response to the query is generated by using NLP model.

Item 15. A non-transitory computer readable medium on which are stored instructions that, when executed, cause a programmable device to:
receive a message from a sender directed to a recipient, the message including a query;
receive an indication that the recipient is unavailable to respond to the query;
provide the query as an input to a machine-learning (ML) model to identify information requested in the query;
obtain the information requested as an output from the ML model;
determine if access to the information requested is available to the sender, based at least on a confidentiality group to which the sender belongs with respect to the information requested, the confidentiality group to which the sender belongs with respect to the information requested being determined based on a degree of association between the sender and the information requested;
upon determining that access to the information requested is available, generate a response to the query, the response including the information requested; and
providing the response to the sender.

Item 16. The non-transitory computer readable medium of item 15, wherein the instructions further cause the programmable device to determine if the message contains a query.

Item 17. The non-transitory computer readable medium of item 16, wherein the instructions further cause the programmable device to determine if the query relates to a document, to social interaction, or to other information.

Item 18. The non-transitory computer readable medium of any one of items 15-17, wherein the ML model includes a natural language processing (NLP) model.

Item 19. The non-transitory computer readable medium of any one of items 15-18, wherein the instructions further cause the programmable device to provide a notification to the recipient of the response to the query.

Item 20. The non-transitory computer readable medium of any one of items 15-19, wherein the degree of association between the sender and the information requested is determined by creating an association map between information, one or more documents or one or more users based at least in part on contextual document data and user-specific data.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a message from a sender directed to a recipient, the message including a query;
receiving an indication that the recipient is unavailable to respond to the query and subsequently providing the query as an input to a machine-learning (ML) model to identify information requested in the query;
obtaining the information requested as an output from the ML model;
determining if access to the information requested is available to the sender, based at least on a confidentiality group to which the sender belongs with respect to the information requested, the confidentiality group to which the sender belongs with respect to the information requested being determined based on a degree of association between the sender and the information requested;
upon determining that access to the information requested is available, generating a response to the query, the response including the information requested; and providing the response to the sender,
wherein the degree of association between the sender and the information requested is determined by creating an association map between one or more documents and one or more users based at least in part on contextual document data and user-specific data.

2. The data processing system of claim 1, wherein the instructions further cause the processor to cause the data processing system to perform functions of determining if the message contains a query.

3. The data processing system of claim 1, wherein the instructions further cause the processor to cause the data processing system to perform functions of determining if the query relates to a document, to social interaction, or to other information.

4. The data processing system of claim 1, wherein the ML model includes a natural language processing (NLP) model.

5. The data processing system of claim 1, wherein the instructions further cause the processor to cause the data processing system to perform functions of providing a notification to the recipient of the response to the query.

6. The data processing system of claim 1, wherein the response to the query is generated by using an NLP model.

7. A method, performed by one or more computer processors, for responding to a message directed to a recipient, comprising:
receiving the message from a sender, the message including a query;
receiving an indication that the recipient is unavailable to respond to the query and subsequently providing the query as an input to a machine-learning (ML) model to identify information requested in the query;
obtaining the information requested as an output from the ML model;
determining if access to the information requested is available to the sender, based at least on a confidentiality group to which the sender belongs with respect to the information requested, the confidentiality group to which the sender belongs with respect to the information requested being determined based on a degree of association between the sender and the information requested;
upon determining that access to the information requested is available, generating a response to the query, the response including the information requested; and providing the response to the sender,
wherein the degree of association between the sender and the information requested is determined by creating an association map between one or more documents and one or more users based at least in part on contextual document data and user-specific data.

8. The method of claim 7, further comprising determining if the message contains a query.

9. The method of claim 8, further comprising determining if the query relates to a document, to social interaction, or to other information.

10. The method of claim 7, wherein the ML model includes a natural language processing (NLP) model.

11. The method of claim 7, further comprising providing a notification to the recipient of the response to the query.

12. The method of claim 7, wherein the response to the query is generated by using an NLP model.

13. A non-transitory computer readable medium on which are stored instructions that, when executed, cause a programmable device to:
receive a message from a sender directed to a recipient, the message including a query;
receive an indication that the recipient is unavailable to respond to the query and subsequently provide the query as an input to a machine-learning (ML) model to identify information requested in the query;
obtain the information requested as an output from the ML model;
determine if access to the information requested is available to the sender, based at least on a confidentiality group to which the sender belongs with respect to the information requested, the confidentiality group to which the sender belongs with respect to the information requested being determined based on a degree of association between the sender and the information requested;

upon determining that access to the information requested is available, generate a response to the query, the response including the information requested; and providing the response to the sender, wherein the degree of association between the sender and the information requested is determined by creating an association map between one or more documents and one or more users based at least in part on contextual document data and user-specific data.

14. The non-transitory computer readable medium of claim 13, wherein the instructions further cause the programmable device to determine if the message contains a query.

15. The non-transitory computer readable medium of claim 14, wherein the instructions further cause the programmable device to determine if the query relates to a document, to social interaction, or to other information.

16. The non-transitory computer readable medium of claim 13, wherein the ML model includes a natural language processing (NLP) model.

17. The non-transitory computer readable medium of claim 13, wherein the instructions further cause the programmable device to provide a notification to the recipient of the response to the query.

* * * * *